(12) United States Patent
Hilgendorff et al.

(10) Patent No.: US 7,534,739 B2
(45) Date of Patent: May 19, 2009

(54) PLATINUM-FREE CHELATE-CATALYST MATERIAL FOR THE SELECTIVE REDUCTION OF OXYGEN AND METHOD FOR PRODUCTION THEREOF

(75) Inventors: Marcus Hilgendorff, Hanover (DE); Iris Dorbandt, Berlin (DE); Hendrik Schulenburg, Kiekebusch (DE); Michael Bron, Darmstadt (DE); Sebastian Fiechter, Berlin (DE); Peter Bogdanoff, Berlin (DE); Helmut Tributsch, Berlin (DE)

(73) Assignee: Helmholtz-Zentrum Berlin Fuer Materialien und Energie, Berlin (DE)

( * ) Notice: Subject to any disclaimer, the term of this patent is extended or adjusted under 35 U.S.C. 154(b) by 928 days.

(21) Appl. No.: 10/482,975

(22) PCT Filed: Jul. 3, 2002

(86) PCT No.: PCT/DE02/02496

§ 371 (c)(1),
(2), (4) Date: Jul. 2, 2004

(87) PCT Pub. No.: WO03/004156

PCT Pub. Date: Jan. 16, 2003

(65) Prior Publication Data

US 2004/0236157 A1    Nov. 25, 2004

(30) Foreign Application Priority Data

Jul. 3, 2001    (DE) ................... 101 32 490

(51) Int. Cl.
*B01J 31/18*    (2006.01)
*B01J 21/18*    (2006.01)
*B01J 27/24*    (2006.01)
*B01J 27/02*    (2006.01)

(52) U.S. Cl. .............. 502/162; 502/180; 502/200; 502/222

(58) Field of Classification Search .......... 502/167
See application file for complete search history.

(56) References Cited

OTHER PUBLICATIONS

Rongzhong et al.: "Remarkably Active Catalysts for the Electroreduction of O2 to H2O for Use in an Acidic Electrolyte Containing Concentrated Methanol"; Journal of the Electrochemical Society, 147, (12) 4605-4609 (2000).

Lefevre et al.: "O2 Reduction in PEM Fuel Cells: Activity and Active Site Structural Information for Catalysts Obtained by the Pyrolysis at High Temperature of Fe Precursors"; J. Phys. Chem. B 2000, 104, 11238-11247.

Faubert et al.: "Oxygen reduction catalysts for polymer electrolyte fuel cells from the pyrolysis of FeII acetate adsorbed on 3,4,9,10-perylenetetracarboxylic dianhydride;" Electrochimica Acta 44 (1999) 2589-2603.

McNicol et al.: "Direct methanol-air fuel cells for road transportation"; Journal of Power Sources 83 (1999) 15-31.

Toshirou et al.: "Electrode for Fuel Cell. Air Cell"; Patent Abstract of Japan JP59138066 (1984).

*Primary Examiner*—Melvin C Mayes
*Assistant Examiner*—James Corno
(74) *Attorney, Agent, or Firm*—Karl Hormann

(57) ABSTRACT

A platinum-free chelate catalyst material consisting of at least one unsupported transition metal, a nitrogen-containing organo-metallic transition complex, a further transition metal other than the unsupported transition metal and a chalcogenic compound.

15 Claims, 3 Drawing Sheets

200 nm

US 7,534,739 B2

PLATINUM-FREE CHELATE-CATALYST MATERIAL FOR THE SELECTIVE REDUCTION OF OXYGEN AND METHOD FOR PRODUCTION THEREOF

BACKGROUND OF THE INVENTION

1. Field of the Invention

The invention relates to a platinum-free chelate catalyst material for the selective reduction of oxygen with at least one unsupported transition metal, a nitrogen and a carbon component structured as a porous conductive carbon matrix into which the unsupported transition metal and a transition metal chelate coordinated by the nitrogen are respectively bonded as electron donor and catalytic center, and to a method of its production.

2. The Prior Art

A major field of application of catalysts are electrochemical cells and, in this context, emission-free fuel cells in particular, for generating electricity efficiently and in an environmentally friendly manner by converting the chemical energy of a fuel oxidation reaction into electrical energy without prior heat generation. The fuel cell is particularly efficient if hydrogen is converted to electrical energy. From among the many types of fuel cells, the polymer electrolyte membrane (PEM) which is suitable in an excellent manner for operation with hydrogen/oxygen or hydrogen/air is to be specially mentioned. In this connection, the low energy density of hydrogen is a problem, however, which is the reason for the increasing use of methyl alcohol as a fuel. On the one hand, methyl alcohol can be catalytically converted into hydrogen and carbon dioxide in a vehicle (indirect methyl alcohol fuel cell) or, on the other hand, it can be directly oxidized at the anode. In this context, the one which can be realized in the technically simplest way is the direct methanol/air fuel cell (DMFC). For that reason, it may be considered to be a highly promising electrochemical source of energy for small appliances and electric motors. Hitherto, mixed platinum/ruthenium sponges or so-called "carrier catalysts" have primarily been used as catalyst materials for the anode in DMFC's, in which minute metal particles are precipitated on a conductive carrier material such as carbon black or graphite. Pure platinum or supported platinum are used as catalyst for the cathode. However, pure platinum does not act selectively, and problems arise, therefore, if methane is used as the fuel. While the cathode and the anode are separated from each other by a proton-conductive membrane as a connector between them, it is pervious to methane which may reach the cathode where it will be oxidized as well. In this manner, the cathode which is to reduce the air oxygen, depolarizes and reduced conduction will occur.

The present invention resides in the field of platinum-free catalyst materials which reduce selectively and which are thus resistant to alkanoles, and, in this context, within the group of chelate catalyst materials. A chelate is a catalytically very active higher order complex compound in which a central metal ion, forming several compounds, is surrounded in the manner of a ring by one or more molecules or ions. Different platinum-free, methanol-resistant chelate catalyst materials in supported or unsupported form have already been described in scientific literature. Yet none of the known types of catalyst material hereinafter to be described have been technically used as their catalytic activity and stability cannot be judged to be sufficient. The presence of highly conductive carbon of a large specific surface is essential for technical applications. Not only does the high-temperature reaction of the chelates result in improved activity but it also increases the stability of the catalyst material. In this connection it is necessary to distinguish between direct feeding of conductive carbon, such as, for instance, carbon black, and an in-situ-production of the carbon matrix by the polymerization of suitable oregano-metallic chelates to which the invention relates also.

The article [I] "direct methanol—air fuel cells for road transportation" (B. D. McNicol et al., Journal of Power Sources 83 (1999) pp. 15-31, describes catalyst materials with non-noble metals for use in DMFC (Chapter 4.5.2). Alternative preparations of organo-metallic chelates such as iron or cobalt porphyries and phtalo cyanines as well as tetraazaannulene are being described. In this connection, in a metal tetra phenyl porphyrene as the active chelate, a metal ion is surrounded by four nitrogen atoms ($MeN_4$) each of which is bonded to a monopyrrol ring. The catalytic activity of these compounds for oxygen reduction has also been known for some time. Different transition metals used in the chelates lead to different results. Whereas the use of cobalt leads to a significantly increased activity, iron results in a marked increase in stability. Even if some of the reports relate to a very good catalytic activity, these materials nevertheless do not at present display sufficient stability to be useful in fuel cells.

The prior publication [II] by Contamin et al. reports upon the preparation of a cobalt-containing electrocatalyst by pyrolysis of cobalt tetraazaannulene in the presence of active charcoal soot (see O. Contamin, C. Debiemme-Chouvy, M. Savy and G. Scarbeck: "Oxygen electroreduction catalysis: Effect of Sulfur Addition on Cobalt Tetraazaannulene Precursors", Electrochimica Acta 45 (1999), pp. 721-7291. When adding thio urea to the starter preparation, the authors observed a significant increase in the activity of the catalyst. The active center consists of two oppositely positioned cobalt atoms bonded to the carbon matrix by C—S-bridges.

JP 59138066 describes the production of a catalyst material by mixing transition metal compounds with cobalt, copper, nickel, molybdenum, and/or tin with iron, urea and, for instance, a pyromellitinic acid anhydride followed by a temperature treatment in the presence of a conductive carbon substrate. It results in a metal-phtalo-cyanine-polymer with an integration of the used different transition metals which are bonded as cores into the metal chelates. The material is being proposed for use in alkaline fuel cells. As regards the parallel use of several different transition metals, a scientific paper is yet to be mentioned, which reports on the catalytic activity of unsupported mixtures of cobalt tetraphenylporphyrine (COTPP) and iron tetraphenylporphyrene (FeTPP). In accordance with the publication [III] by R. Jiang and D. Chu ("Remarkably Active Catalysts for the Electroreduction of $O_2$ to $H_2O$ for Use in an Acidic Electrolyte Containing Concentrated Methanol", Journal of the Electrochemical Society 147 (12), pp. 4605-4609 (2000)), the binary mixture of CoTPP and FeTPP treated at 600° C. under argon displayed an increased catalytic activity relative to pure temperature-treated substances. The structure of the material is, however, relatively compact and has no significant porosity.

U.S. Pat. No. 6,245,707 describes methanol-tolerant electrocatalysts for the oxygen reduction on the basis of nitrogen-chelates with at least two different transition metals (e.g. metal tetraphenylporphyrene), which in the presence of a carbon support are converted by thermal treatment to an active cathode catalyst for use in low temperature fuel cells.

Mixing of a ferrous salt (iron acetate) with perylene tetra-carboxyanhydride (PTCDA) followed by temperature treatment in the presence of ammonia ($NH_3$) gas for producing a chelate catalyst material is known from the essay [IV] "Oxygen reduction catalysts for polymer electrolyte fuel cells from the pyrolysis of FeII acetate adsorbed on 3,4,9,10 perylene tetracarboxylic dianhydride" by G. Faubert et al. (Electrochimica Acta 44 (1999), pp. 2589-2603). The PTCDA produces a porous conductive carbon matrix, and $NH_3$ introduces nitrogen. In the introduction of this essay particular attention is directed to the fact that for producing a stable non-noble metal-based catalyst material a transition metal such as Fe or Co derived from a salt, as well as a nitrogen and a carbon source, are required. This may be realized in situ by polymerization of the carbon source.

The prior art from which the invention is proceeding is described in the essay [V] "$O_2$ Reduction in PEM Fuel Cells: Activity and Active Site Structural Information for Catalysts Obtained by Pyrolysis at High Temperature of Fe Precursors" by M. Lefévre et al. (J. Phys. Chem. B (2000)). In this context, FeII acetate as precursor compound is mixed with PTCDA as organic compound in the presence of $NH_3$ as nitrogen precursor compound and is pyrolyzed at a high temperature in excess of 800° C. The polymerization of the metal and nitrogen-free PTCDA results in situ in a porous conductive carbon matrix into which individual iron atoms are adsorptively bonded as electron donors and as iron chelate coordinated by four nitrogen atoms. The essay reveals that the catalyst activity of the chelate catalyst material may be affected by way of the iron content and the temperature of the pyrolysis. However, this is insufficient for any commercial application which is based not least on the relatively low attained porosity. Furthermore, no adequate stability can be attained. Moreover, in the synthesis, a matrix former as well as a nitrogen donor separated therefrom, must be used in addition to the transition metal.

OBJECTS OF THE INVENTION

It is, therefore, an object of the invention to provide a platinum-free chelate catalyst material of the kind referred to above, which is of a particularly high catalytic activity and stability and which is thus particularly suitable for commercial applications. In this connection, the knowledge gained form the prior art in respect of the effects of different transition metals and the obtainable porosity is to be taken into consideration. In addition, the chelate catalyst material in accordance with the invention is to consist of few components and is to be producible by but a few manufacturing steps even on a large industrial scale.

SUMMARY OF THE INVENTION

In connection with the chelate catalyst material in accordance with the invention with at least one unsupported transition metal as well as a nitrogen and a carbon component, the method is accomplished by the nitrogen and carbon component being formed as a common nitrogen-containing organo-metallic transition complex with a further transition metal different from the unsupported transition metal with the further transition metal being coordinated with the transition metal chelate by the nitrogen and by a chalcogen compound is bonded into the carbon matrix between the unsupported transition metal sporadically occurring in the carbon matrix and the coordinated transition metal chelate.

In accordance with the chelate catalyst material in accordance with the invention, a carbon matrix structured into the nanometer range is formed by polymerization from the nitrogen-containing organo-metallic transition complex. As a result of free ions of at least two transition metals, the carbon matrix, as well as being electrically conductive, is also permeated by catalytic reaction centers. The bonded unsupported transition metal ions act primarily as electron donors for the reaction centers which consist of the further transition metal in the nitrogen-containing organo-metallic transition complex and which are coordinated by the nitrogen atoms into active Me—$N_4$-cores. By a combination of different transition metals in the chelate catalyst material in accordance with the invention, the advantageous properties thereof may additively be exploited in various functions. On the one hand, the catalytic activity and on the other hand the stability may be significantly increased by an appropriate selection of the transition metals which are respectively bonded into the carbon matrix as electron donors and chelate cores. The additionally provided chalcogen component contributes to a further increase of the catalytic activity in the inventive chelate catalyst material. The unsupported and the coordinated transition metal are electrically connected to each other by integrated chalcogen bridges so that the electrons from the electron donating transition metal may be transmitted particularly well to the catalytically active transition metal in the chelate cores.

In the chelate catalyst material in accordance with the invention only a small portion of the unsupported transition metal derived during synthesis from the used precursor compound is bonded to the carbon matrix. By far the largest portion serves during in situ production of the carbon matrix as a nano-pore forming filler material and following their formation are washed out again (see below) in a separate step of the method. In this aspect, the catalyst material differs from the electro catalysts described supra. The additional space-maintaining function of the unsupported transition metal yields a highly porous structuring of the carbon matrix which by enlargement of the active surface also contributes to an increase in the catalysis activity. Thus, the unsupported transition metal which is present as a metal oxalate for instance, acts as a blowing agent during the polymerization of the nitrogen-containing transition metal chelate. Moreover, the chelate catalyst material in accordance with the invention is compounded of a few components only since the nitrogen and the carbon donor are combined in a common material component.

The platinum-free chelate catalyst material described in the context of the invention may be used in the cathode of a fuel cell. The costs of the material amount at most to one tenth of the costs of a platinum-containing catalyst material. Hence, utilization of the material in accordance with the invention contributes to a significant lowering of the costs of a fuel cell module of conventional construction which continues to utilize the platinum-containing catalyst materials. Further advantages of the inventive chelate catalyst material are its unlimited availability of the components used and its alconal resistance, so that permeation of methanol to the cathode does not result in a reduced efficiency of the fuel cell.

Further improvements will be apparent from other advantageous embodiments of the chelate catalyst material to be described. In detail, this may relate to at least one unsupported transition metal being a group VIII transition metal, in particular iron or ruthenium. The elements of this group exhibit an especially high catalytic effectiveness; often they are used as finely dispersed particles. Their presence not only affects a physical deposit of the reacting substances on the surface (adsorption), but also a chemical activation of the adsorbed particles. The activity of ruthenium especially resembles that of platinum without, however, reaching the level of costs thereof. It represents a highly promising alternative to platinum. While the raw material costs of ruthenium as a noble metal exceed those of simple transition metals and is of lower specific catalytic activity. However, by an appropriate treatment its catalytic activity may be significantly increased. It is possible to combine several transition metals. The improvements of the effects may be achieved by ion formation as well as by the formation of nanoparticles from the chosen transition metals. Ruthenium in particular, when used as unsupported transition metal, can form particularly small nanoparticles which in turn result in an ultra-highly porous carbon matrix. In addition, ruthenium constitutes an excellent electron donor. Its application thus results in an increase of the catalytic activity as well as of the stability.

The further transition metal different from the unsupported transition metal in the nitrogen-containing organo-metallic transition complex may, in accordance with a further embodiment of the invention, be cobalt or iron, in particular. In a combination of iron as the unsupported transition metal and cobalt as the transition metal in the nitrogen-containing organo-metallic transition complex their advantages may be optimally used in a catalysis. Iron, the positive effects of which have already been described in detail above, is an excellent electron donor. It also increases the stability; cobalt, on the other hand, improves the activity of the catalyst material. Advantageously, the nitrogen-containing organo-metallic transition complex is a metallo-porphyrine. It may contain cobalt or iron and may, more particularly, be constituted as cobalt tetramethoxyphenylporphyrine or iron tetramethoxyphenylporphyrine. Metalloporphyrines exhibit an excellent catalytic ability because the active transition metals are freely coordinated in space by four nitrogen bonds. As a result, both surface accessibility and catalytic effect are optimal. In combination with the respective other transition metal as the unsupported transition metal the effects are improved still further. In the metalloporphyrine both or more transition metals may be applied. The metalloporphyrine combines the nitrogen and the carbon donor with each other. In highly cross-linked structures, it polymerizes already at moderate process temperatures in the range of 450° C. and during in situ synthesis it is forming an ultra highly porous yet stable carbon matrix. The in situ production results in a particularly homogeneous distribution of the electron donors and of the active cores within the carbon matrix. This ensures a uniformly high quality of the inventive chelate catalyst material. To augment the carbon matrix an added carbon support, particularly carbon black, may be provided. For instance, an electron-donating transition metal may be supported by carbon and may thus facilitate and improve the production of the carbon matrix by adsorptive bonding.

The positive effects of transition metals on the electrochemical catalysis are well known. But the organic chalcogen compound additionally utilized in the chelate catalyst material in accordance with the invention has a significant effect on the catalytic activity, particularly as regards a catalytic initial action. In this connection, it may be advantageous to add the chalcogen in elementary form (e.g. sulfur) or as an organic chalcogen compound (e.g. thio urea). The positive effects of sulfur, in particular for forming bridges, are generally known. Its lower toxicity and greater availability, compared to selenium, are also known. For that reason, the chalcogen compound in accordance with a further embodiment of the invention, may be thiourea which may be synthesized in a simple manner and which may be used for many purposes. Urea ($OC(NH_2)_2$) as well as carbamide also contain nitrogen. Thus, the further advantage results of an additional nitrogen donor being available for the coordination during chelate formation in the catalyst material in accordance with the invention.

A particularly simple and process-efficient method of producing a platinum-free chelate catalyst material for the selective reduction of oxygen with at least one unsupported transition metal, a nitrogen and a carbon component structured as a porous conductive carbon matrix into which are bonded the unsupported transition metal as an electron donor and transition metal coordinated by the nitrogen as a catalysis center, provides for the following method steps:

mixing of a transition metal salt as precursor compound for the unsupported transition metal with the nitrogen-containing organo-metallic transition complex and the organic chalcogen compound;

heating the mixture to a pyrolysis temperature in the range of 450° C. during a period of a several hours;

cooling the polymerized mixture and mixing with an acid;

boiling the acid mixture during a period of a few minutes and subsequent cooling;

removal of the resultant powder by suction and washing with deionized water;

drying of the powdered chelate catalyst material.

During production of the chelate catalyst material in accordance with the invention, a spongy transition metal containing a carbon matrix is formed by a fine transition metal salt being initially covered with the nitrogen-containing organo-metallic transition complex and the organic chalcogen compound by mixing. The mixture is then subjected to pyrolysis at a moderate temperature range of 450° C. This initially causes evaporation of the crystal water bound in the transition metal salt. Thereafter, the organic chalcogen compound decomposes, and the nitrogen-containing organo-metallic transition complex melts. The latter begins to polymerize causing a strongly cross-linked and, hence, very stable carbon matrix to be formed. During this process, decomposition of the at least one unsupported transition metal salt commences simultaneously. This causes formation, with the generation of a gas, of nanocrystals from the unsupported transition metal. However, a fraction of the transition metal is also firmly bonded to the carbon matrix. The carbon matrix formed from the polymerizing nitrogen-containing organo-metallic transition complex deposits around the nanocrystals from the at least one transition metal. At the selected moderate process temperature, the coordination sphere for the $MeN_4$ cores is substantially maintained. The chalcogen from the organic chalcogen compound is bonded into the carbon matrix as electrically conductive connecting bridges between the unsupported transition metal and the chelate cores. The formed nanocrystals are then washed out in a subsequent step which is entirely novel in the context of such methods of synthesis, and a conductive highly porous carbon matrix with nano and micro structures and containing transition metals, chalcogen and nitrogen remains.

The formed highly porous carbon matrix is already of excellent stability and activity for the selective oxygen reduction. However, in accordance with a particularly advantageous embodiment of the method, the activity can be further improved by a process step to be executed before or after the process step of boiling the acid mixture:

Heating the powdered chelate catalyst material under a protective atmosphere to a high temperature in the range of 850° C. over a period of one hour or more.

Furthermore, iron may be provided as unsupported transition metal by iron oxolate as a precursor material. Oxalate is the salt of oxal acid; it is very reactive and is available at low cost on an industrial scale.

DESCRIPTION OF THE SEVERAL DRAWINGS

The novel features which are considered to be characteristic of the invention are set forth with particularity in the appended claims. The invention itself, however, in respect of its structure, construction and lay-out, as well as manufacturing techniques, together with other objects and advantages thereof, will be best understood from the following description when read with reference to the drawings, in which:

DETAILED DESCRIPTION OF THE PREFERRED EMBODIMENT 3.35 g of iron oxalate $FeC_2O_4*2H_2O$ as precursor compound is mixed with 0.65 g of cobalt tetramethoxyphenylporphyrine (COTMPP) as nitrogen-containing metal-organic transition complex and 0.18 g of thiourea as organic chalcogen compound and heated to 450° C. for 2 h and then at 850° C. for 1 h. The mixture is cooled and suspended with 300 ml of 1 N HCl solution in an argon atmosphere and thereafter heated to boiling for 30 min. After cooling, the black powder is removed on the filtration device by suction and washed in deionized water. Thereafter, the powder is dried.

Figure 1:
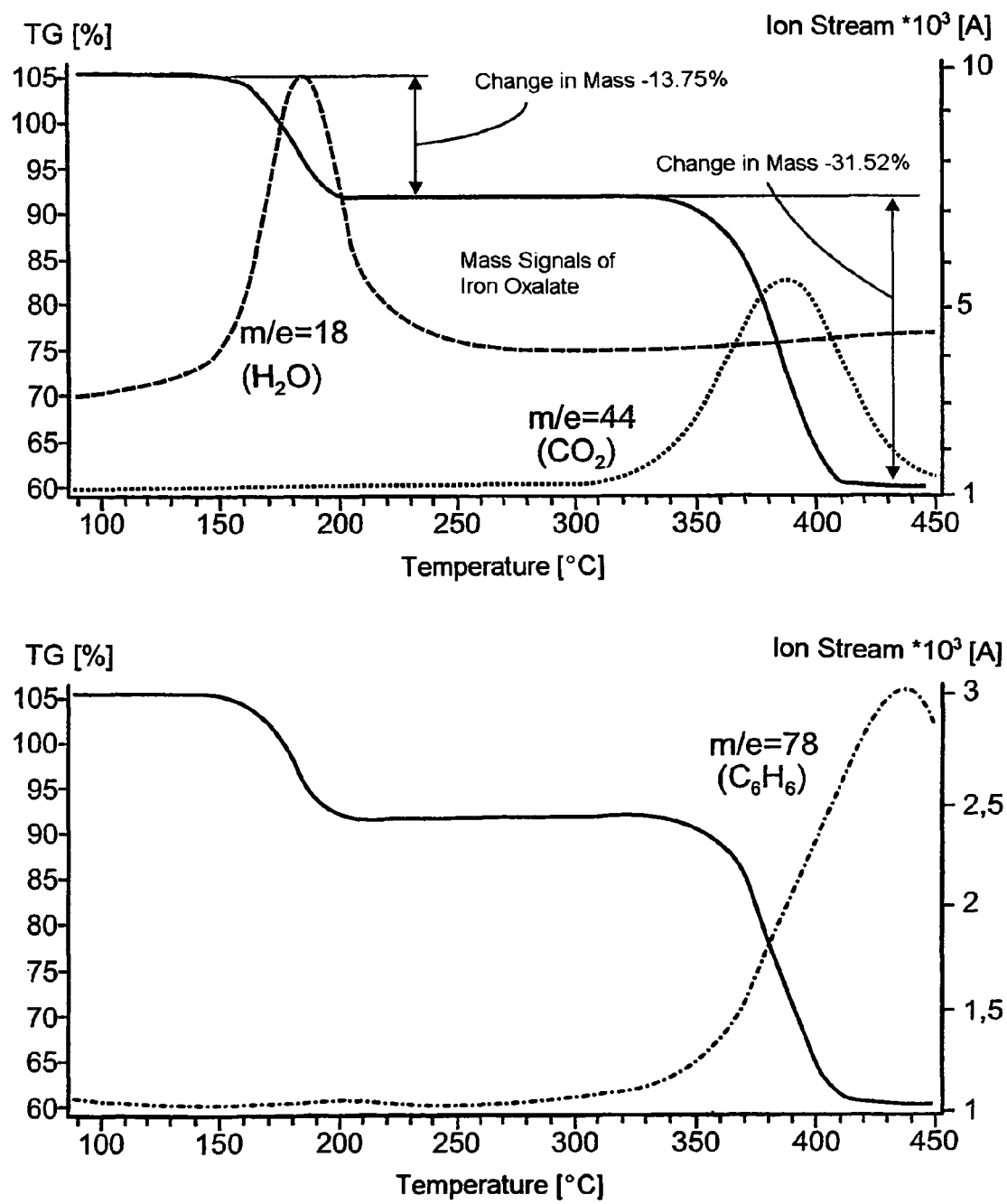
FIG. 1 is a thermogravimetric decomposition curve of the unsupported metal (iron oxalate) in the presence of the platinum-free chelate catalyst material.

In the embodiment, a spongy iron-containing carbon matrix is formed by covering a fine iron oxalate with COTMPP and thiourea. This mixture of iron oxalate, CoTMPP and thiourea is then subjected to temperature treatment. Initially, the crystal water bound in the iron oxalate evaporates. Thereafter, the thiourea decomposes. The COTMPP melts and begins to polymerize causing formation of a carbon matrix. In this connection, see FIG. 1, which depicts thermogravimetric curve (loss of mass TG, solid line) of the two—stage decomposition of cobalt tetramethoxyphenylporpyrine (COTMPP) in the presence of iron oxalate. In a first stage, crystal water of the iron oxalate is evaporated, shown by the simultaneously measured mass signal m/e=18 (dashed line in the upper diagram). In a second stage, the iron oxalate decomposes (m/e=44, $CO_2$ formation, dotted line in the upper diagram) as well as, during the same temperature interval, the COTMPP, shown by the mass m/e=m78 ($C_5H_6$ formation, dot-dashed line in the lower diagram).

The decomposition of the iron oxalate commences at the same time as the polymerization process. This leads, with a simultaneous development of $CO_2$ and CO gas, to the formation of iron" oxide (FeO) nanocrystals; but a fraction of the iron will also be firmly bonded into the carbon structure. The carbon matrix formed from the polymerizing CoTMPP deposits around these nanocrystals. At the temperature at which these processes are conducted the coordination sphere of the cobalt ions is substantially maintained. The sulfur released from the sulfur urea is integrated as an electrically conductive connection bridge into the carbon matrix between the electron-donating iron and the catalytically active cobalt chelate. The nitrogen atoms also released during the decomposition are used in the coordination of the cobalt atoms relative to the chelate chores in addition to the nitrogen atoms from the COTMPP. The formed FeO crystals are then washed out during an ensuing step and a conductive, highly porous iron, cobalt nitrogen and sulfur-containing carbon matrix remains. The activity of this substrate as regards oxygen reduction is already very good. The activity can, however, only be further increased by a further temperature treatment at 850° C.

Figure 2:
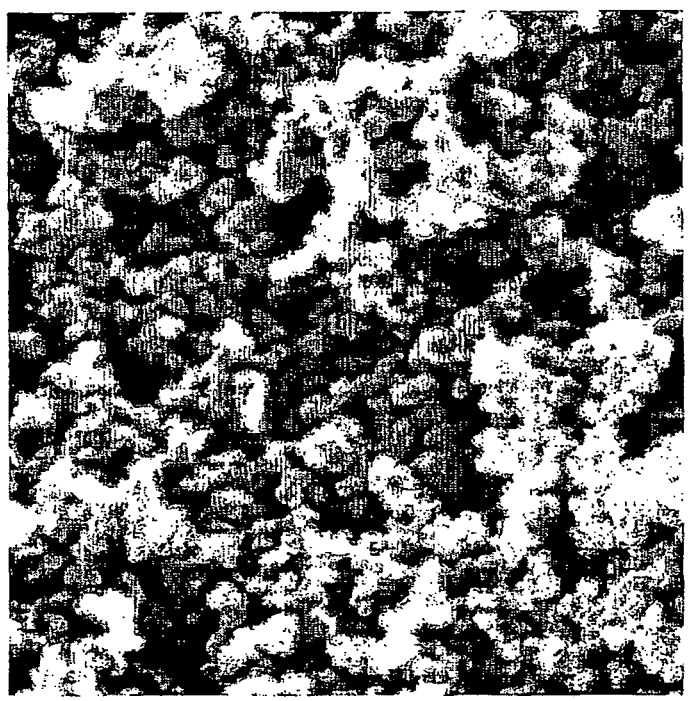
FIG. 2 is an image taken with a raster electron microscope of the platinum-free chelate catalyst material after termination of its preparation.

In order to judge the porosity of the catalytic materials, the specific capacity of the catalyst material in accordance with the invention was defined by electrochemical experiments under nitrogen. Capacities between 100 and 300 F/g were attained. The values are in the range of commercial highly porous carbon black. Moreover, investigations with a raster electron microscope confirmed the high porosity of the material up into the range of nanometers. In this connection, see FIG. 2, which depicts an image of the catalyst material in accordance with the invention formed with a raster electron microscope following acid treatment. The highly porous structure may be clearly seen.

Figure 3:
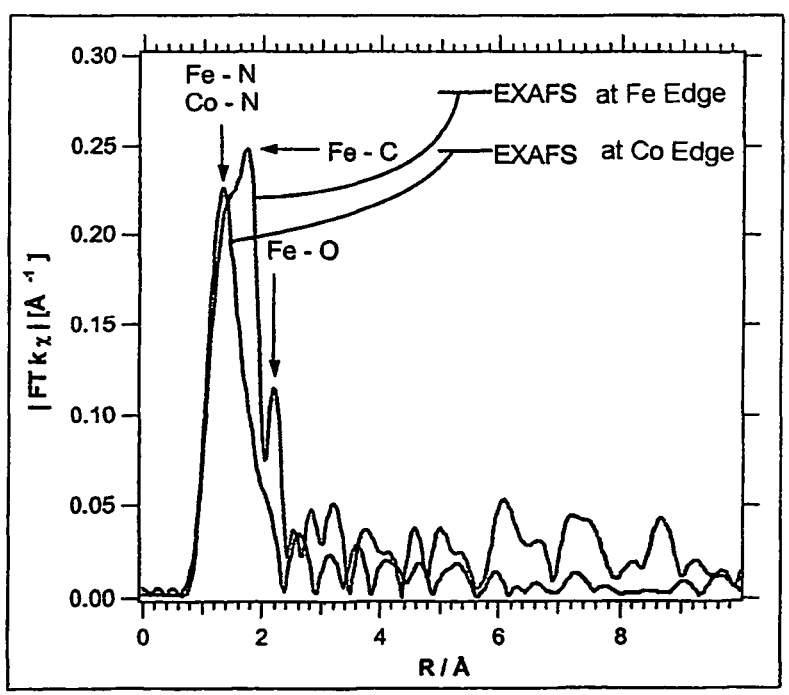
FIG. 3 is an EXAFS spectrum inn the presence of the platinum-free chelate catalyst material.

In research relating to catalysts it is considered to be firmly established that transition elements are acting catalytically since in their absence no chemical changes take place. Also, the existence of the electron and its inevitable participation in chemical reactions is scientifically undisputed. By extended X-ray absorption fine structure (EXAFS) analysis and using synchrotron radiation it was possible to measure the spacing between the transition metals and the elements nitrogen, carbon and oxygen in catalyst material in accordance with the invention. In this connection, see FIG. 3, which depicts Fournier-transformed EXAFS spectra at the Fe and Co edge of a carbon-supported Fe—Co catalyst which was produced by pyrolysis of COTMPP in the presence of iron oxalate. To remove pure metal particles the catalyst was etched in acid prior to being measured. The peak layers detected allow an inference of the presence of metal-nitrogen bonds (nitrides) in the catalyst material, in addition to the metal carbon (carbide) and metal oxygen (oxides), which are considered cores of previous nitrogen coordinated transition metal chelates in an in situ formed carbon support.

Figure 4:
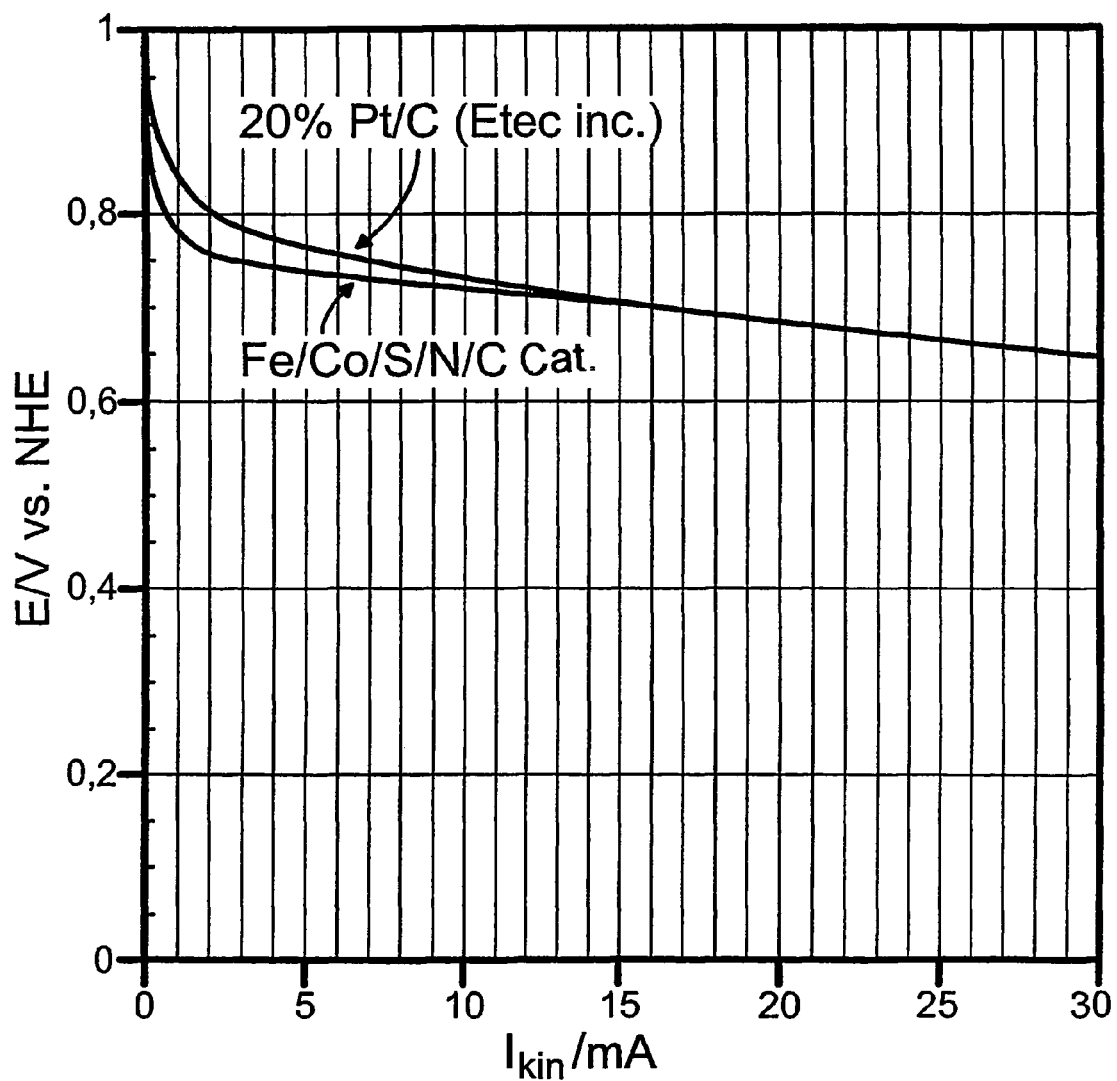
FIG. 4 is a current density diagram of the platinum-free chelate catalyst material compared to a standard platinum catalyst.

Electrochemical Characterization 10 mg of the chelate catalyst powder are suspended for 30 min in a ultra-sound bath in a mixture of 1 ml of an ethanolic 0.2% NAFION solution and 1 ml of deionized water. 5 ml of this suspension are deposited by a dropper on a polished glassy carbon electrode of 1 mm diameter and dried in air. The working electrode thus prepared is measured in a 3 electrode arrangement in $O_2$ saturated solution, with a mercury sulfate electrode as a reference electrode and a platinum wire as a counter electrode in 0.5 M $H_2SO_4$ solution as an electrolyte. The diffusion-corrected current densities as a function of the potential difference between working and counter electrode are shown in FIG. 4 by comparison to a standard platinum catalyst (20% platinum on Vulcan XC 72R of Etek Inc., upper curve.

The voltage differences relative to the Etek catalyst are

| | |
|---|---|
| 60 mV | at .2 mA/cm$^2$; |
| 40 mV | at 2 mA/cm$^2$; |
| 20 mV | at 10 mA/cm$^2$; and |
| 0 mV | at 20 mA/cm$^2$. |

The measured voltage differences drop at increasing current density and, relative to the prior art, are to be classified as extremely small. The platinum-free chelate catalyst material in accordance with the invention thus has a catalytic activity which is almost identical to a conventional standard catalyst material using expensive platinum.

The invention claimed is:

1. A platinum-free chelate catalyst material for the selective reduction of oxygen, comprising:
  a nitrogen component;
  a carbon component structured as a porous conductive carbon matrix;
  at least one unsupported transition metal bonded into the carbon matrix as a an electron donor;
  a transition metal chelate coordinated by the nitrogen bonded into the carbon matrix as a catalysis center,
  the nitrogen and the carbon components being commonly formed as a nitrogen-containing organo-metallic transition complex with a further transition metal different from the unsupported transition metal;
  the further transition metal being coordinated to the transition metal chelate by the nitrogen; and
  an organic chalcogen compound bonded into the carbon matrix as an electron-conductive bridge-former between the unsupported transition metal occurring but singly in the carbon matrix and the coordinated transition metal chelate.

2. The catalyst material of claim 1, wherein the at least one unsupported transition metal is a group VIII transition metal.

3. The catalyst material of claim 2, wherein the unsupported transition metal is at least one of iron and ruthenium.

4. The catalyst material of claim 1, wherein the further transition metal is a group VIII transition metal.

5. The catalyst material of claim 4, wherein the further transition metal is at least one of cobalt and iron.

6. The catalyst material of claim 1, wherein the nitrogen-containing organo-metallic transition complex is a metalloporphyrine.

7. The catalyst material of claim 6, wherein the metalloporphyrine contains at least one of cobalt and iron.

8. The catalyst material of claim 7, wherein the metalloporphyrine is is structured as at least one of cobalt tetramethoxyphenylporphyrine (COTMPP) and iron tetramethoxyphenylporphyrine (FeTMPP).

9. The catalyst material of claim 1, comprising an additional carbon component for augmenting the formation of the carbon matrix.

10. The catalyst material of claim 9, wherein the additional carbon component comprises carbon black.

11. The catalyst material of claim 1, wherein the chalcogen in the organic chalcogen compound comprises sulfur.

12. The catalyst material of claim 1, wherein the chalcogen compound comprises thiourea.

13. A method of producing a platinum-free chelate catalyst material for the selective reduction of oxygen with at least one unsupported transition metal, a nitrogen and a carbon component structured as a porous conductive carbon matrix into which the unsupported transition metal is bonded as an electron donor and a transition metal chelate coordinated by the nitrogen is bonded as a catalysis center, comprising the steps of:
  mixing of a transition metal salt as precursor compound for the unsupported transition metal with a nitrogen-containing organo-metallic transition complex with a further transition metal different from the unsupported transition metal and an organic chalcogen compound;
  polymerizing the mixture by heating to a pyrolysis temperature in the range of 450° C. during a period of several hours;
  cooling the polymerized mixture mixing the polymerized mixture with an acid; boiling the acid mixture during a period of a few minutes and subsequent cooling;
  removing powder resulting from boiling and cooling the acid mixture by suction and washing with deionized water; and drying the washed powder to derive a chelate catalyst material in powdered form.

14. The method of claim 13, further comprising the step of:
  heating the powdered chelate catalyst material in a protective atmosphere to a temperature in a range of 850° C. during a period of at least one hour.

15. The method of claim 13, further comprising the step of using iron oxalate as a precursor compound for providing iron as the unsupported transition metal.

* * * * *